(12) United States Patent
Fisher et al.

(10) Patent No.: US 7,550,404 B2
(45) Date of Patent: Jun. 23, 2009

(54) WOOD-POLYMER-ZEOLITE COMPOSITES

(75) Inventors: Erin D. Fisher, Bath, PA (US); Roman W. Wypart, Tampa, FL (US); Bonita Kristofferson Marcus, Radnor, PA (US)

(73) Assignee: PQ Corporation, Berwyn, PA (US)

( * ) Notice: Subject to any disclaimer, the term of this patent is extended or adjusted under 35 U.S.C. 154(b) by 638 days.

(21) Appl. No.: 11/241,047

(22) Filed: Sep. 30, 2005

(65) Prior Publication Data
US 2007/0078050 A1 Apr. 5, 2007

(51) Int. Cl.
*B01J 29/06* (2006.01)
*C08L 1/00* (2006.01)
*B22F 7/00* (2006.01)

(52) U.S. Cl. .................... 502/60; 428/549; 428/326; 428/393; 428/507; 524/13; 524/35; 524/450

(58) Field of Classification Search .................. 502/60; 428/549, 326, 393, 507; 524/13, 35, 450
See application file for complete search history.

(56) References Cited

U.S. PATENT DOCUMENTS

| | | |
|---|---|---|
| 3,827,869 A | 8/1974 | Bonin |
| 3,888,810 A | 6/1975 | Shinomura |
| 4,000,100 A | 12/1976 | Baldyga |
| 4,250,081 A | 2/1981 | Bode et al. |
| 4,420,582 A | 12/1983 | Canard et al. |
| 4,833,181 A | 5/1989 | Narukawa et al. |
| 5,432,214 A | 7/1995 | Lancesseur |
| 6,054,207 A | 4/2000 | Finley |
| 6,106,956 A | 8/2000 | Heyn et al. |
| 6,682,789 B2 | 1/2004 | Godavarti et al. |
| 2003/0100683 A1 | 5/2003 | Toyoizumi et al. |
| 2007/0110984 A1 | 5/2007 | Reedy |

FOREIGN PATENT DOCUMENTS

| | | |
|---|---|---|
| JP | 59-129240 A | 7/1984 |
| JP | 2000-334297 | 12/2000 |
| JP | 2001-073300 | 3/2001 |
| JP | 2004-230613 A | 8/2004 |

OTHER PUBLICATIONS

Lilli Manolis Sherman, Wood-Filled Plastics—They Need the Right Additives for Strength, Good Looks & Long Life, *Plastics Technology*, Online Article, http://www.plasticstechnology.com/articles/200407fa1.html, Printed Apr. 7, 2005.
Declaration Under 37 C.F.R. § 1.132, by Michael E. Reedy, dated Jan. 2, 2008, filed in U.S. Appl. No. 11/273,922.
"Foamed Natural Fiber and Wood Composites," presented by Michael E. Reedy at The Global Outlook for Natural Fiber & Wood Composites 2003, Dec. 3-5, 2003 at the Marriott Hotel in New Orleans, Louisiana.
Office Action dated Aug. 6, 2007, in U.S. Appl. No. 11/273,922.
Reedy International Corporation Product Description—SEKUR™.
Reedy International Corporation Technical Service Bulletin—SAFTEC® WSD-Wood Stabilizer.
Reedy International Corporation Technical Service Bulletin—SAFTEC® WLB Edge 100.
Reedy International Corporation Technical Service Bulletin—SAFTEC® AS.
Reedy International Corporation Product Description—Wood Composites.
Reedy International Corporation Product Description—Condensation Polymers.

*Primary Examiner*—Elizabeth D Wood
(74) *Attorney, Agent, or Firm*—Buchanan Ingersoll & Rooney PC; Michael L. Dever

(57) ABSTRACT

Composite materials containing a cellulose component such as wood fibers or particles, a zeolite component, and a polymer such as polyethylene, polypropylene, or polyvinyl chloride are able to provide good physical strength performance. The composites may be prepared by any of a number of mixing and forming processes, and may be used for making lumber and other structural materials.

63 Claims, No Drawings

WOOD-POLYMER-ZEOLITE COMPOSITES

BACKGROUND OF THE INVENTION

Composite materials made from wood or other cellulose fibers or particles in combination with polymers such as polyethylene, polypropylene, and polyvinyl chloride have gathered increasing interest in recent years. Such "wood-polymer composites" have attracted attention due to the possibility of achieving products having the wood tone appearance of natural lumber combined with the durability of plastics. Inexpensive sources of plastics, such as from recycling operations, may provide additional advantages in terms of cost. However, one challenge is to provide composites having good physical properties relating to strength and toughness. Thus, there is commercial interest in compositions containing polymers and cellulose fibers or particles, particularly those exhibiting good physical properties.

SUMMARY OF THE INVENTION

In one aspect, the invention provides a composite material containing a consolidated mixture. The mixture includes
 a) a particulate or fibrous cellulose component;
 b) a zeolite; and
 c) a polymer selected from the group consisting of polymers including at least 50 wt % ethylene repeat units, polymers including at least 50 wt % propylene repeat units, polymers including at least 50 wt % vinyl chloride repeat units, and mixtures thereof.

In another aspect, the invention provides a method of making a composite material containing a consolidated mixture. The method includes blending together
 a) a particulate or fibrous cellulose component;
 b) a zeolite; and
 c) a polymer selected from the group consisting of polyethylene, polypropylene, and polyvinyl chloride.

DETAILED DESCRIPTION OF THE INVENTION

Wood-Polymer-Zeolite Composites

Wood-polymer-zeolite (WPZ) composite materials according to the invention include a consolidated mixture that incorporates a) a particulate or fibrous cellulose component, b) a zeolite, and c) a polymer. By including a zeolite in the composition, the inventors have found that a composite material having excellent physical properties may be produced. In particular, proper incorporation of suitable amounts and types of zeolites may result in high tensile stress at yield, high tensile stress at break, and high flexural modulus, all of which are key engineering performance parameters for many applications, particularly those requiring structural strength. Additionally, the zeolites typically act as processing aids in the composite formulations, providing reduced usage of standardized lubricants and protecting the cellulose component during high temperature processing.

The amounts of cellulose, zeolite, and polymer in WPZ composites may be varied over a wide range, depending inter alia upon the exact identity of each ingredient, the amount and type of other ingredients (to be discussed below), and the intended use of the composite. Typically, components a), b) and c) are present within the following respective weight percent ranges:
 0.5 to 90 of a);
 0.1 to 80 of b); and
 3.0 to 99.4 of c).

More preferably, the amounts of these components will be within the following ranges:
 1 to 60 of a);
 0.5 to 50 of b); and
 5 to 60 of c).

Each ingredient will now be discussed in detail, followed by a description of methods of making the WPZ composites, potential applications of the composites, and Examples.

Zeolite

Zeolites suitable for use according to the invention include any known varieties, for example A, X, P, Y, and natural zeolites. As used herein, the term "zeolite" means a substantially crystalline aluminosilicate material with discrete channels and cages that allow the diffusion of small molecules into and out of their crystalline structures. The zeolite framework is made up of $SiO_4$ tetrahedra linked by shared oxygen atoms. Substitution of aluminum for silicon creates a charge imbalance that requires a non-framework cation to balance the charge. These cations, which are contained inside the channels and cages of these materials, may be replaced by other cations giving rise to ion-exchange properties. The water in these materials may typically be reversibly removed, leaving the host structure intact, although some framework distortion may occur.

It is desirable that at least 90% of the particles are less than 50 µm, advantageously less than 25 µm, and most suitably less than about 10 µm in size. Especially suitable are zeolites in which at least 90% of the particles are less than 4 µm in size, and in some cases 90% of the particles are less than 0.8 µm in size. In some embodiments of the invention, particularly good WPZ properties may be obtained by use of zeolite A having an mean particle size between 0.01 and 30 µm, and more particularly between 0.1 and 10 µm. Particularly suitable zeolites have a mean particle size from 0.01 to 4 µm, preferable from 0.01 to 1 µm, and more preferably from 0.01 to 0.6 µm.

Typically, suitable zeolites have a significant level of crystallinity, and in some embodiments the mean percent zeolite crystallinity is at least 50 as compared to a reference standard. In some embodiments, the zeolite has a mean micropore diameter in the range of 2.8 to 8 Å, and/or an external surface area in the range of 3 to 300 $m^2/g$. Suitable exemplary zeolites are available commercially under the trade names VALFOR 100 and ADVERA 401PS, both available from PQ Corporation of Valley Forge, Pa. Also useful are zeolites in which some or all of the sodium ions have been replaced by potassium and/or calcium ions, for example zeolites 3A and 5A. Other nonlimiting examples of suitable potential ion-exchanged cations are Ag, Zn, and Cu, and replacement of sodium by these may be partial or complete.

Cellulose Component

Although the term "wood-polymer-zeolite composite" is used herein to describe the compositions of this invention, it is to be understood that the term encompasses materials in which cellulosic materials other than wood (i.e., other than wood flour, fibers, or pulp, etc.) are used, either in addition to or instead of wood-derived materials. Thus, the particulate or fibrous cellulose component may comprise cellulose in any of a number of forms, including as nonlimiting examples wood flour or fibers, wood pulp, wheat fibers, rice hulls, kenaf, flax, hemp, and mixtures of these. Typically wood fibers or flour will be used, and any commercially available variety is generally suitable for use according to the invention. In some embodiments, the wood flour is soft pine having a particle size of <40 mesh with a moisture content of <7%. However, any variety of hardwood or softwood could be used, usually dependent on the location of the manufacturer. The particle size of the cellulose component may vary over a wide range, and no particular limitations of particle size need be placed for purposes of this invention.

Polymer

Suitable polymers comprise at least 50 wt % ethylene repeat units, at least 50 wt % propylene repeat units, or at least 50 wt % vinyl chloride repeat units. In some embodiments, the polymer may comprise a low- or high-density polyethylene, polypropylene, or polyvinyl chloride homopolymer. One suitable polymer is a high-density polyethylene sold as Equistar ALATHON L 5040 by Lyondell Chemical Company of Houston, Tex. Copolymers may also be used, for example when the physical properties of the finished product need modification, such as copolymers of ethylene with hexene or heptene. Or, other copolymers such as polypropylene with approximately 3% ethylene comonomer content (as a fluxing agent) may be used when faster production rates are desired. In the case of polyvinyl chloride polymers, polyvinyl chloride homopolymer resins such as Shintech SE950EG or copolymers of vinyl chloride with 3-10% of vinyl acetate can be used. Another suitable polymer component may be a polymer made from the protein keratin (e.g., from chicken feathers), glycerol and sodium sulfite. Mixtures of any of the above-noted polymers may be used, for example mixtures of recycled polymers.

Compatibilizer

Wood-polymer-zeolite composites according to the invention may benefit from the inclusion of a compatibilizer. The choice of a suitable compatibilizer may improve the mechanical properties of the WPZ composite by increasing adhesion between the various components of the mixture. Any of a number of materials may be used, with the exact type and amount of compatibilizer depending on a number of factors well known to the person of skill in the art. The compatibilizer is typically a polymeric material that contains repeat units of some of the same monomers that constitute one or more of the component c) polymers mentioned above. It also typically contains a moiety that interacts strongly, for example by reaction, with the cellulose component a). One type of compatibilizer is a polyepoxide, for example an ethylene-glycidyl methacrylate copolymer or terpolymer. Suitable examples include LOTADER AX8840 ethylene-glycidyl methacrylate copolymer, and AX8900, 8920, and 8950 ethylene-methyl acrylate-glycidyl methacrylate terpolymers, available from Arkema of Philadelphia, Pa.

Another class of suitable compatibilizers includes polyanhydrides, for example maleic anhydride grafted polypropylenes, ethylene-propylene-maleic anhydride copolymers, and ethylene-propylene-diene-maleic anhydride copolymers. Other examples include styrene-acrylonitrile-maleic anhydride copolymers and methyl methacrylate-acrylonitrile-maleic anhydride copolymers, which may for example be suitable for use when polymer component c) includes polyvinyl chloride (or other) polymers. Other examples include styrene-maleic anhydride copolymers, such as are available commercially from NOVA Chemicals Corporation of Calgary, Alberta, Canada under the trade name DYLARK. Additional suitable polyanhydrides include ethylene-maleic anhydride copolymers, graft copolymers or terpolymers, for example ethylene-maleic anhydride-(meth)acrylic acid terpolymers or ethylene-maleic anhydride-acrylic ester terpolymers. One particularly suitable example of the latter is an ethylene-maleic anhydride-butyl acrylate terpolymer, one example of which is available commercially from Arkema under the trade name LOTADER 3210. In general, the amount of compatibilizer (if any) used in the WPZ composite may typically range between 0.01 and 5 wt %, more typically between 0.3 and 2.0 wt %, based on the total composition weight. However, any amount may be used, and the exact amount will depend upon the type and relative amount of polymer, zeolite, cellulosic component utilized.

Other Ingredients

Wood-polymer-zeolite composites may further comprise any of a number of other ingredients. Examples include stabilizers, process aids, impact modifiers (e.g., rubber-based modifiers), lubricants, plasticizers, antioxidants, UV absorbers, and pigments or other colorants. Also useful may be foaming agents, fungicides or algaecides, and/or flame retardants, all of which are known in the art. Suitable exemplary foaming agents include HYDROCEROL endothermic or exothermic compositions, available from Clariant Masterbatches of Holden, Mass., and exemplary lubricants include pentaerythritol esters such as LOXIOL G 70 S, available from Cognis North America of Cincinnati, Ohio. The WPZ composite may further comprise one or more inorganic fillers, suitable nonlimiting examples of which include talc, calcium carbonate, glass beads, and mica. Another suitable filler is bird feathers.

Preparation of Wood-Polymer-Zeolite Composites

The invention also provides methods of making WPZ composites such as described above. It has been found that processing of these compositions, for example by melt extrusion, can be performed at higher-than-expected temperatures while still avoiding excessive discoloration of the product. Higher processing throughput and/or reduced binding of composite in the extruder are frequently achieved, and are apparently related to the presence of the zeolite.

In general, methods of making WPZ composite materials comprise forming a consolidated mixture by any method known in the polymer processing art. Such forming methods include powder mixing of the components then powder pressing, powder two-roll milling and calendering or powder extruding. Injection molding of the powder blends can also be used. Suitable non-limiting examples of processing methods are extrusion and milling.

Uses of Wood-Polymer-Zeolite Composites

Wood-polymer-zeolite composites according to the invention may be used in any of a number of end-use applications, in which their superior physical performance properties may be used to advantage. One useful application is in building products, including as nonlimiting examples lumber and related structural materials. As used herein, the term "lumber" means planks, sheets, or other pieces resembling typical wood-based materials such as sawn lumber, oriented strand board, particle board, plywood, etc. Thus, WPZ composites may be used to make products such as fences, railings, decking for outdoor porches and the like, panels for floors, ceilings, wall, bath or shower stalls, cabinetry, countertops, and other structural items. They may also be used as automotive construction materials, for example in decorative interiors, door panels, headliners, seat interiors, and other uses, as well as in any of a variety of industrial products such as piers and docks, or consumer products such as furniture.

EXAMPLES

Following is an identification of various ingredients used in the Examples, and sources from which they may be obtained.

Glossary of Ingredients

| Ingredient Name | Description | Manufacturer | Location |
|---|---|---|---|
| ADVASTAB TM181 | methyltin mercaptide | Rohm and Haas | Spring House, PA |
| ADVERA 401PS | hydrated sodium zeolite A | PQ Corporation | Valley Forge, PA |
| ADVERA 401F | hydrated sodium zeolite A | PQ Corporation | Valley Forge, PA |
| 13X Zeolite | hydrated sodium zeolite 13X | PQ Corporation | Valley Forge, PA |
| Zeolite P | hydrated sodium zeolite P | PQ Corporation | Valley Forge, PA |
| Nano-A[1] | hydrated sub-micron sodium zeolite A | | |
| CABSORB ZS500RW2 | Chabazite | GSA Resources | Tucson, AZ |
| ALATHON L5040 | high density polyethylene | Equistar Chemicals | Cincinnati, OH |
| GLYCOLUBE 825 | glyceryl monostearate | Lonza, Inc. | Alendale, NJ |
| PARALOID K120ND | acrylic process aid | Rohm and Haas | Spring House, PA |
| PETROTHENE PP31SF01X01L5040 | polypropylene homopolymer | Equistar Chemicals | Cincinnati, OH |
| EPOLENE E-43 | chemically modified polypropylene | Eastman | Kingsport, TN |
| SUPERPFLEX 100 | calcium carbonate | Specialty Minerals | Bethlehem, PA |
| Talc CT325 | hydrated magnesium silicate | Specialty Minerals | Bethlehem, PA |
| LOXIOL G70S | high molecular weight complex ester lubricant | Cognis Corporation | Cincinnati, OH |
| LOTADER 3210 | Ethylene-maleic anhydride-butyl acrylate terpolymer | Arkema Inc. | Philadelphia, PA |
| TYRIN 3615 | chlorinated polyethylene | Dow Chemical Co. | Midland, MI |
| 40 mesh wood flour | soft pine wood flour | American Wood Fibers | Schofield, WI |

[1]Nano-A was prepared by the methods described in PCT International Application No. PCT/US2004/025993, filed Aug. 11, 2004, and had a mean particle size less than 1 μm and greater than 50% crystallinity.
[2]CABSORB was prepared by grinding the material in a micro-mill before processing in a wood-plastic-zeolite formulation. CABSORB chabazite is a natural (mined) zeolite.

General Procedure

Unless otherwise noted, compositions in the following examples were prepared by first mixing wood flour with zeolite (and other inorganic materials, if present) in a Henschel mixer. All of the other ingredients were separately mixed by rolling, and then the two mixtures were combined in the roll mixer. All formulations are given in weight percents. In all cases, Tensile Stress was performed per ASTM D638 and Flexural Modulus was performed per ASTM D790.

Example 1

A series of wood-polymer-zeolite composites were prepared, illustrating the effect of adding zeolite A to a wood flour/HDPE composite formulation. Mixing was performed as in the general procedure. After combining all ingredients, the formulation was extruded through a Brabender twin screw extruder having the following die temperature set up: 190, 185, 185, 180° C. die & 75 rpm. Testing results are shown in Table 1.

TABLE 1

| | WPZ Composite Formulations | | | | |
|---|---|---|---|---|---|
| Ingredients | 1 | 2 | 3 | 4 | 5 |
| ALATHON L5040 HDPE | 45 | 44 | 43 | 36 | 46 |
| 40 mesh Soft Pine Wood Flour | 50 | 50 | 50 | 50 | 50 |
| ADVERA 401PS | | 1 | 2 | 3 | 10 |
| LOXIOL G-70S | 1 | 1 | 1 | 1 | 1 |
| LOTADER 3210 | 3 | 3 | 3 | 3 | 3 |
| Tensile Stress @ Yield (psi) | 1162 | 1315 | 1670 | 1590 | 1500 |
| Tensile Stress @ Break (psi) | 1085 | 1273 | 1676 | 1640 | 1514 |
| Flexural Modulus (ksi) | 153 | 156 | 170 | 182 | 95 |

The results shown in Table 1 show, somewhat surprisingly, that the physical properties of the composite improved significantly as zeolite loading increased. Further work relating to this discovery is shown in the other examples below.

Example 2

A second series of wood-polymer-zeolite composites was prepared, illustrating the effect of adding zeolite A to a wood flour/HDPE composite formulation and further illustrating the effect of adding a compatibilizer. After combining all ingredients, the formulation was extruded with a Brabender twin screw extruder having the following 0.75" die temperature setup: 185, 180, 175, 175° C. die & 60 rpm. Testing results are shown in Table 2.

TABLE 2

| | WPZ Composite Formulations | | | | |
|---|---|---|---|---|---|
| Ingredients | 1 | 2 | 3 | 4 | 5 |
| ALATHON L5040 HDPE | 46 | 43 | 41 | 39 | 31 |
| 40 mesh Soft Pine Wood Flour | 50 | 50 | 50 | 50 | 50 |
| ADVERA 401PS | | 3 | 5 | 7 | 15 |
| LOXIOL G-70S | 1 | 1 | 1 | 1 | 1 |
| LOTADER 3210 | 3 | 3 | 3 | 3 | 3 |
| Tensile Stress @ Yield (psi) | 1759 | 2044 | 2018 | 2084 | 2181 |
| Tensile Stress @ Break (psi) | 1649 | 2117 | 2194 | 2380 | 2809 |
| Flexural Modulus (ksi) | 304 | 347 | 501 | 394 | 304 |

The results shown in Table 2 indicate that as the loading of zeolite increased, better physical properties were observed. Additionally, subjective assessment of the quality of the extrudates revealed that, in many cases, extrudates including a zeolite had relatively smooth edges compared with those containing no zeolite. Modified extrusion conditions, particularly with respect to temperature, provided even better results. See for example the control (Column 1) in Table 1 vs. the control in Table 2, with the modified conditions of Table 2 showing generally better results. However, for a given set of processing conditions, properties tended to improve with increasing zeolite content.

Example 3

A series of wood-polymer-zeolite composites was prepared, illustrating the effect of adding several different types of zeolite to a wood flour/HDPE composite formulation. The formulation was extruded as in Example 2. Testing results are shown in Table 3.

TABLE 3

| Ingredients | WPZ Composite Formulations | | | | | |
|---|---|---|---|---|---|---|
|  | 1 | 2 | 3 | 4 | 5 | 6 |
| ALATHON L5040 HDPE | 46 | 39 | 39 | 39 | 39 | 39 |
| 40 mesh Soft Pine Wood Flour | 50 | 50 | 50 | 50 | 50 | 50 |
| ADVERA 401PS |  | 7 |  |  |  |  |
| 13X Zeolite |  |  | 7 |  |  |  |
| ADVERA 401F |  |  |  | 7 |  |  |
| Zeolite P |  |  |  |  | 7 |  |
| CABSORB ZS500RW |  |  |  |  |  | 7 |
| LOXIOL G-70S | 1 | 1 | 1 | 1 | 1 | 1 |
| LOTADER 3210 | 3 | 3 | 3 | 3 | 3 | 3 |
| Tensile Stress @ Yield (psi) | 1437 | 2269 | 1853 | 1584 | 1491 | 517 |
| Tensile Stress @ Break (psi) | 1679 | 2324 | 1854 | 1825 | 1555 | 613 |
| Flexural Modulus (ksi) | 245 | 434 | 334 | 347 | 326 | 119 |

The results shown in Table 3 compare the effectiveness of several zeolite types. The data show that all zeolites helped the physical properties versus no zeolite, but that Advera 401PS was the most efficient in improving the physical properties in these particular formulations.

Example 4

A series of wood-polymer-zeolite composites was prepared, illustrating the effect of varying the wood flour content in a wood flour/HDPE composite formulation containing zeolite A. The formulation was prepared as described above under General Procedure, and then milled on a 2-roll mill at 375° F. The milled formulation was subsequently pressed on a Wabash press at 375° F. for 2 minutes at low pressure, then for 6 minutes at high pressure, and finally for 5 minutes under cooling pressure. Testing results are shown in Table 4.

TABLE 4

| Ingredients | WPZ Composite Formulations | | | | | |
|---|---|---|---|---|---|---|
|  | 1 | 2 | 3 | 4 | 5 | 6 |
| ALATHON L5040 HDPE | 46 | 39 | 61 | 54 | 31 | 24 |
| 40 mesh Soft Pine Wood Flour | 50 | 50 | 35 | 35 | 65 | 65 |
| ADVERA 401PS |  | 7 |  | 7 |  | 7 |
| LOXIOL G-70S | 1 | 1 | 1 | 1 | 1 | 1 |
| LOTADER 3210 | 3 | 3 | 3 | 3 | 3 | 3 |
| Tensile Stress @ Yield (psi) | 2305 | 2786 | 1337 | 2288 | 336 | 1863 |
| Tensile Stress @ Break (psi) | 2508 | 3215 | 1261 | 2511 | 832 | 1854 |
| Flexural Modulus (ksi) | 578 | 554 | 175 | 301 | 479 | 711 |

The results shown in Table 4 indicate that no matter what the wood fiber loading rate was, the zeolite improved the physical properties of the WPZ composite.

Example 5

A series of wood-polymer-zeolite composites was prepared, illustrating the effect of varying the zeolite content in a wood flour/HDPE composite formulation containing zeolite A, and illustrating the effect of adding bentonite clay to the composition. The formulation was milled and pressed as in Example 4. Testing results are shown in Table 5.

TABLE 5

| Ingredients | WPZ Composite Formulations | | | | | |
|---|---|---|---|---|---|---|
|  | 1 | 2 | 3 | 4 | 5 | 6 |
| ALATHON L5040 HDPE | 61 | 41 | 36 | 31 | 23 | 46 |
| 40 mesh Soft Pine Wood Flour | 35 | 35 | 35 | 35 | 23 | 35 |
| ADVERA 401PS |  | 20 | 25 | 30 | 50 |  |
| Bentonite (National Premium WT) |  |  |  |  |  | 15 |
| LOXIOL G-70S | 1 | 1 | 1 | 1 | 1 | 1 |
| LOTADER 3210 | 3 | 3 | 3 | 3 | 3 | 3 |
| Tensile Stress @ Yield (psi) | 1623 | 1849 | 2010 | 2606 | 2514 | 1745 |
| Tensile Stress @ Break (psi) | 2088 | 3202 | 3304 | 4100 | 3317 | 2291 |
| Flexural Modulus (ksi) | 223 | 351 | 371 | 612 | 521 | 297 |

The results shown in Table 5 indicate that at significantly higher loadings of zeolite, i.e. 30-50%, the physical properties improved, especially flexural modulus. The optimum zeolite addition level in this series appears to be about 30 pph zeolite.

It was found that Bentonite negatively impacted the color of the composite (made the color darker; data not shown here), even at a lower loading level than those at which zeolite was used. In addition to the poorer color, the Bentonite formulation gave poorer physical properties than those obtained with zeolite.

Example 6

A series of wood-polymer-zeolite composites was prepared, illustrating the effect of varying the type and amount of zeolite in a wood flour/HDPE composite formulation containing zeolite A, and illustrating the effect of adding talc or calcium carbonate to the composition. The formulation was milled and pressed as in Example 4. testing results are shown in Table 6.

TABLE 6

| Ingredients | WPZ Composite Formulations | | | | | | |
|---|---|---|---|---|---|---|---|
|  | 1 | 2 | 3 | 4 | 5 | 6 | 7 |
| ALATHON L5040 HDPE | 46 | 39 | 46 | 46 | 39 | 46 | 46 |
| 40 mesh Soft Pine Wood Flour | 35 | 35 | 35 | 35 | 35 | 35 | 35 |
| ADVERA 401PS |  | 7 | 7 |  | 7 | 7 | 15 |
| Talc | 15 | 15 | 8 |  |  |  |  |
| Calcium Carbonate |  |  |  | 15 | 15 | 8 |  |
| LOXIOL G-70S | 1 | 1 | 1 | 1 | 1 | 1 | 1 |
| LOTADER 3210 | 3 | 3 | 3 | 3 | 3 | 3 | 3 |
| Tensile Stress @ Yield (psi) | 1941 | 2475 | 2211 | 1731 | 2558 | 2026 | 2350 |
| Tensile Stress @ Break (psi) | 2104 | 2925 | 2755 | 1919 | 3114 | 2480 | 3067 |
| Flexural Modulus (ksi) | 342 | 490 | 410 | 274 | 355 | 253 | 309 |

The results shown in Table 6 indicate that zeolite A improved the physical property performance of WPZ composites even when other fillers such as talc and calcium carbonate were also included in the formulation.

Example 7

A series of wood-polymer-zeolite composites was prepared, illustrating the effect of varying the amount of talc added to a wood flour/HDPE composite formulation containing zeolite A. The formulation was milled and pressed as in Example 4. Testing results are shown in Table 7.

TABLE 7

|  | WPZ Composite Formulations | | | |
|---|---|---|---|---|
| Ingredients | 1 | 2 | 3 | 4 |
| ALATHON L5040 HDPE | 48 | 33 | 33 | 33 |
| 40 mesh Soft Pine Wood Flour | 48 | 33 | 33 | 33 |
| ADVERA 401PS |  |  | 15 | 7 |
| LOXIOL G-70S | 1 | 1 | 1 | 1 |
| LOTADER 3210 | 3 | 3 | 3 | 3 |
| Talc |  | 30 | 15 | 23 |
| Tensile Stress @ Yield (psi) | 1148 | 1396 | 2460 | 2183 |
| Tensile Stress @ Break (psi) | 1551 | 1408 | 2749 | 2398 |
| Flexural Modulus (ksi) | 330 | 380 | 307 | 374 |

The results shown in Table 7 indicate that even with very high filler loadings (talc) and reduced polymer and wood flour loadings, the addition of zeolite improved the physical properties (tensile stress) as the zeolite loadings increased.

Example 8

A series of wood-polymer-zeolite composites was prepared, illustrating the effect of varying the mean particle size of the zeolite in a wood flour/HDPE composite formulation containing zeolite A. The deagglomerated Nano-A was prepared by passing the as produced Nano-A through a Glen Mills disc mill with the rotor/stator gap at 3-4 full rotations from the point of disc contact. The milled Nano-A was prepared by passing the as produced Nano-A through the mill described above with the rotor/stator gap at slightly greater than the point of disc contact. The milled and dried Nano-A was prepared using the milled process described above and then drying the material at 85° C. overnight. The formulation was milled and pressed as in Example 4. Testing results are shown in Table 8.

TABLE 8

|  | WPZ Composite Formulations | | | | | |
|---|---|---|---|---|---|---|
| Ingredients | 1 | 2 | 3 | 4 | 5 | 6 |
| ALATHON L5040 HDPE | 46 | 39 | 39 | 39 | 39 | 39 |
| 40 mesh Soft Pine Wood Flour | 50 | 50 | 50 | 50 | 50 | 50 |
| ADAVERA 401PS |  | 7 |  |  |  |  |
| Nano-A (2104-86-1) |  |  | 7 |  |  |  |
| Nano-A, Deagglomerated |  |  |  | 7 |  |  |
| Nano-A, Milled |  |  |  |  | 7 |  |
| Nano-A, Milled and Dried |  |  |  |  |  | 7 |
| LOXIOL G-70S | 1 | 1 | 1 | 1 | 1 | 1 |
| LOTADER 3210 | 3 | 3 | 3 | 3 | 3 | 3 |
| Tensile Stress @ Yield (psi) | 1437 | 2269 | 1868 | 3205 | 2478 | 2472 |
| Tensile Stress @ Break (psi) | 1679 | 2324 | 1970 | 3607 | 2995 | 3231 |
| Flexural Modulus (ksi) | 245 | 434 | 284 | 418 | 531 | 471 |

The results shown in Table 8 indicate that a deagglomerated sub-micron Nano-A zeolite (run 4) improved the physical properties of the WPZ composite, relative to the unmodified Nano-A shown in run 3. Milling the Nano-A, optionally with subsequent drying (runs 5 and 6), also improved performance.

Example 9

A series of wood-polymer-zeolite composites was prepared, illustrating the effect of varying the zeolite content in a wood flour/HDPE composite formulation containing Nano-A zeolite. Testing results are shown in Table 9.

TABLE 9

|  | WPZ Composite Formulations | | | | | | |
|---|---|---|---|---|---|---|---|
| Ingredients | 1 | 2 | 3 | 4 | 5 | 6 | 7 |
| ALATHON L5040 HDPE | 61 | 54 | 54 | 41 | 36 | 31 | 23 |
| 40 mesh Soft Pine Wood Flour | 35 | 35 | 35 | 35 | 35 | 35 | 23 |
| ADVERA 401PS |  | 7 |  |  |  |  |  |
| Nano-A, Deagglomerated |  |  | 7 | 20 | 25 | 30 | 50 |
| LOXIOL G-70S | 1 | 1 | 1 | 1 | 1 | 1 | 1 |
| LOTADER 3210 | 3 | 3 | 3 | 3 | 3 | 3 | 3 |
| Tensile Stress @ Yield (psi) | 1623 | 2461 | 1593 | 2832 | 2034 | 3346 | 2702 |
| Tensile Stress @ Break (psi) | 2088 | 2678 | 1928 | 3909 | 2556 | 4425 | 3147 |
| Flexural Modulus (ksi) | 223 | 296 | 188 | 400 | 286 | 655 | 746 |

The results shown in Table 9 indicate that as the Nano-A zeolite loading level increased, the physical properties of the formulation improved dramatically. The optimum Nano-A zeolite addition level in this series appears to be about 30 pph zeolite.

Example 10

A series of wood-polymer-zeolite composites was prepared, illustrating the effect of varying the wood flour content in a wood flour/polypropylene composite formulation containing zeolite A. The formulation was milled and pressed as in Example 4. Testing results are shown in Table 10.

TABLE 10

|  | WPZ Composite Formulations | | | | | | |
|---|---|---|---|---|---|---|---|
| Ingredients | 1 | 2 | 3 | 4 | 5 | 6 | 7 |
| Polypropylene | 46 | 39 | 61 | 54 | 51 | 41 | 23 |
| 40 mesh Soft Pine Wood Flour | 50 | 50 | 35 | 35 | 35 | 35 | 23 |
| ADVERA 401PS |  | 7 |  | 7 | 10 | 20 | 50 |
| LOXIOL G-70S | 1 | 1 | 1 | 1 | 1 | 1 | 1 |
| EPOLENE E-43 | 3 | 3 | 3 | 3 | 3 | 3 | 3 |
| Tensile Stress @ Yield (psi) | 2653 | 3258 | 2868 | 2548 | 2963 | 3536 | 1882 |
| Tensile Stress @ Break (psi) | 2817 | 3752 | 3275 | 2743 | 3375 | 3961 | 2014 |
| Flexural Modulus (ksi) | 397 | 490 | 377 | 320 | 554 | 532 | 518 |

The results shown in Table 10 indicate that zeolite improved WPZ composite performance properties in the PP formulation.

Example 11

A series of wood-PVC-zeolite composites was prepared, illustrating the effect of varying the amount of zeolite added to a wood flour/PVC composite formulation. The composites were prepared as follows, using a Henschel lab mixer:

Turn on hot water to heat the mixer jacket, and wait until the water jacket temperature is in the range of 75 to 85° C.

1. Charge 1200 g of PVC and ADVASTAB, and weigh the stabilizer onto the top of the PVC resin. Start the mixing at speed about 3000 RPM. After 5 minutes add the zeolite.

2. At 70° C. add the GLYCOLUBE and LOXIOL lubricants.

4. At 80° C. add the process aid (PARALOID K120ND), impact modifier (TYRIN 3615) and wood fibers.

5. At 85° C. start cooling, stop agitation, open up the mixer and add the filler, mix for several minutes.

6. Switch to cooling and reduce the agitation to 1800 RPM. Cool the batch to about 50° C.

Formulations prepared by the above procedure were extruded as in Example 4, and the physical properties of the resulting composites are shown below in Table 11.

TABLE 11

| | WPZ Composite Formulations | | | |
|---|---|---|---|---|
| Ingredients | 1 | 2 | 3 | 4 |
| PVC (Shintech SE 950EG) | 43.4 | 41.4 | 35.4 | 49.5 |
| ADVASTAB TM181 | 0.6 | 0.6 | 0.6 | 1.5 |
| ADVERA 401PS | 7 | 7 | 15 | |
| Pine wood filler (40 mesh) | 35 | 35 | 35 | 35 |
| TYRIN 3615 | 8 | 10 | 8 | 8 |
| PARALOID K120ND | 1 | 1 | 1 | 1 |
| GLYCOLUBE 825 | 1 | 1 | 1 | 1 |
| LOXIOL G70S | 1 | 1 | 1 | 1 |
| LOTADER 3210 | 3 | 3 | 3 | 3 |
| Izod Impact (ft.lb./in.) | 0.6 | 0.7 | 0.4 | 0.6 |
| Izod Impact S.D. | 0.050 | 0.071 | 0.032 | 0.870 |
| Tensile Stress @ Yield (psi) | 2257 | 3421 | 1721 | 2178 |
| Tensile Stress @ Break (psi) | 2789 | 3747 | 1852 | 2551 |
| Flexural Modulus (ksi) | 582 | 692 | 322 | 390 |

The results shown in Table 11 indicate that zeolites can provide improved physical properties in a PVC formulation. In this example, lower zeolite loading levels were needed versus those required in some polyolefin formulations.

Example 12

A series of wood-PVC-zeolite composites were prepared, illustrating the effect of varying the amount of zeolite added to a wood flour/PVC composite formulation without a compatibilizer. Testing results are shown in Table 12.

TABLE 12

| | WPZ Composite Formulations | | | | | | |
|---|---|---|---|---|---|---|---|
| Ingredients | 1 | 2 | 3 | 4 | 5 | 6 | 7 |
| PVC (Shintech SE 950EG) | 49.5 | 52.5 | 49.5 | 47.5 | 45.5 | 42.5 | 32.5 |
| ADVASTAB TM181 | 1.5 | 1.5 | 1.5 | 1.5 | 1.5 | 1.5 | 1.5 |
| ADVERA 401PS | | | 3 | 5 | 7 | 10 | 20 |
| 40 mesh Soft Pine Wood Flour | 35 | 35 | 35 | 35 | 35 | 35 | 35 |
| TYRIN 3615 | 8 | 8 | 8 | 8 | 8 | 8 | 8 |
| PARALOID K120ND | 1 | 1 | 1 | 1 | 1 | 1 | 1 |
| GLYCOLUBE 825 | 1 | 1 | 1 | 1 | 1 | 1 | 1 |
| LOXIOL G-70S | 1 | 1 | 1 | 1 | 1 | 1 | 1 |
| LOTADER 3210 | 3 | | | | | | |
| Tensile Stress @ Yield (psi) | 2178 | 2550 | 2577 | 2412 | 2414 | 4356 | 2446 |
| Tensile Stress @ Break (psi) | 2551 | 2855 | 2949 | 2652 | 2764 | 4456 | 2577 |
| Flexural Modulus ksi | 390 | 542 | 521 | 632 | 599 | 1171 | 714 |

The results shown in Table 12 indicate that a compatibilizer is not required when formulating a wood-PVC composite formulation according to this invention. These data also indicates that, without a compatibilizer, the physical properties of composites in this series improved as the zeolite loading level increased. The optimum zeolite addition level in this series appears to be about 10 pph zeolite.

The compositions of this invention give very good tensile and flex modulus properties, making the WPZ composites of this invention desirable since they make the product more wood-like. Further, extended weathering tests (2000 hours) indicate very good evenness of color, also very desirable in outdoor applications.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A composite material comprising a consolidated mixture, wherein the mixture comprises
   a) a particulate or fibrous cellulose component;
   b) a zeolite in an amount of from 5 wt % to 80 wt %; and
   c) a polymer selected from the group consisting of polymers comprising at least 50 wt % ethylene repeat units, polymers comprising at least 50 wt % propylene repeat units, polymers comprising at least 50 wt % vinyl chloride repeat units, and mixtures thereof;

wherein at least 90% of particles in the zeolite are less than 10 μm in size.

2. The composite material of claim 1, wherein components a), b) and c) are present within the following weight percent ranges:

0.5 to 90 of a);
5 to 50 of b); and
3.0 to 99.4 of c).

3. The composite material of claim 1, wherein component a) is selected from the group consisting of wood flour or fibers, wood pulp, wheat fibers, rice hulls, kenaf, flax hemp, and mixtures of these.

4. The composite material of claim 1, wherein component b) comprises zeolite A.

5. The composite material of claim 1, wherein component b) comprises zeolite 5A, zeolite 3A, or zeolite A comprising Ag, Zn or Cu ions.

6. The composite material of claim 4, wherein the zeolite A has a mean particle size between 0.01 and 30 µm.

7. The composite material of claim 4, wherein the zeolite A has a mean particle size between 0.1 and 10 µm.

8. The composite material of claim 6, wherein the zeolite A has a mean percent crystallinity of at least 50, and a mean particle size less than 1 µm.

9. The composite material of claim 1, wherein component b) comprises zeolite X.

10. The composite material of claim 1, wherein component b) comprises zeolite P.

11. The composite material of claim 1, wherein component b) comprises zeolite Y.

12. The composite material of claim 1, wherein component b) comprises a natural zeolite.

13. The composite material of claim 1, wherein component c) comprises a polymer comprising at least 50 wt % ethylene repeat units.

14. The composite material of claim 1, wherein component c) comprises a polymer comprising at least 50 wt % propylene repeat units.

15. The composite material of claim 1, wherein component c) comprises a polymer comprising at least 50 wt % vinyl chloride repeat units.

16. The composite material of claim 1, wherein component c) comprises polyvinyl chloride, the mixture further comprising at least one PVC additive selected from the group consisting of stabilizers, process aids, impact modifiers, lubricants, and plasticizers.

17. The composite material of claim 1, wherein the mixture further comprises a polyanhydride.

18. The composite material of claim 17, wherein the polyanhydride comprises a maleic anhydride grafted polypropylene.

19. The composite material of claim 17, wherein the polyanhydride comprises an ethylene-propylene-maleic anhydride copolymer or ethylene-propylene-diene-maleic anhydride copolymer.

20. The composite material of claim 17, wherein the polyanhydride comprises a styrene-acrylonitrile-maleic anhydride copolymer.

21. The composite material of claim 17, wherein the polyanhydride comprises a methyl methacrylate-acrylonitrile-maleic anhydride copolymer.

22. The composite material of claim 17, wherein the polyanhydride comprises a styrene-maleic anhydride copolymer.

23. The composite material of claim 17, wherein the polyanhydride comprises an ethylene-maleic anhydride copolymer, graft copolymer or terpolymer.

24. The composite material of claim 23, wherein the ethylene-maleic anhydride copolymer, graft copolymer or terpolymer comprises an ethylene-maleic anhydride-(meth)acrylic acid terpolymer.

25. The composite material of claim 23, wherein the ethylene-maleic anhydride copolymer, graft copolymer or terpolymer comprises an ethylene-maleic anhydride-acrylic ester terpolymer.

26. The composite material of claim 25, wherein the ethylene-maleic anhydride-acrylic ester terpolymer comprises an ethylene-maleic anhydride-butyl acrylate terpolymer.

27. The composite material of claim 1, wherein the mixture further comprises a polyepoxide.

28. The composite material of claim 27, wherein the polyepoxide comprises an ethylene-glycidyl methacrylate copolymer or terpolymer.

29. The composite material of claim 1, wherein the mixture further comprises one or more inorganic fillers.

30. The composite material of claim 29, wherein the one or more inorganic fillers comprises talc.

31. The composite material of claim 29, wherein the one or more inorganic fillers comprises calcium carbonate.

32. The composite material of claim 29, wherein the one or more inorganic fillers comprises glass beads.

33. The composite material of claim 29, wherein the one or more inorganic fillers comprises mica.

34. The composite material of claim 1, wherein the mixture further comprises one or more rubber-based impact improvement additives.

35. The composite material of claim 1, wherein the mixture further comprises one or more lubricants.

36. The composite material of claim 35, wherein the one or more lubricants comprises one or more pentaerythritol ester lubricants.

37. The composite material of claim 1, wherein the mixture further comprises one or more pigments or colorants.

38. The composite material of claim 1, wherein the mixture further comprises one or more foaming agents.

39. The composite material of claim 1, wherein the mixture further comprises one or more fungicides or algaecides.

40. The composite material of claim 1, wherein the mixture further comprises one or more flame retardants.

41. A method of making a composite material comprising a consolidated mixture, the method comprising blending together
    a) a particulate or fibrous cellulose component;
    b) a zeolite in an amount of from 5 wt % to 80 wt %; and
    c) a polymer selected from the group consisting of polyethylene, polypropylene, and polyvinyl chloride, or a mixture of any of these;
wherein at least 90% of particles in the zeolite are less than 10 µm in size.

42. The method of claim 41, wherein the method further comprises powder pressing the blend of components a), b), and c).

43. The method of claim 41, wherein the method further comprises powder two-roll milling and calendering the blend of components a), b), and c).

44. The method of claim 41, wherein the method further comprises injection molding the blend of components a), b), and c).

45. The method of claim 41, wherein the method further comprises extruding the blend of components a), b), and c).

46. The composite material of claim 1, wherein component b) has a surface area between about 3 $m^2/g$ and about 300 $m^2/g$.

47. The method of claim 41, wherein component b) has a surface area between about 3 m²/g and about 300 m²/g.

48. The composite material of claim 1, wherein component b) has a mean particle size between about 0.01 μm and about 30 μm.

49. The method of claim 41, wherein component b) has a mean particle size between about 0.01 μm and about 30 μm.

50. The composite material of claim 1, wherein component b) is present within a weight percent range between 5 and 50.

51. The method of claim 41, wherein component b) is present within a weight percent range between 5 and 50.

52. The composite material of claim 1, wherein component b) is present within a weight percent range between 7 and 50.

53. The method of claim 41, wherein component b) is present within a weight percent range between 7 and 50.

54. The composite material of claim 1, wherein component b) is present within a weight percent range between 10 and 50.

55. The method of claim 41, wherein component b) is present within a weight percent range between 10 and 50.

56. The composite material of claim 1, wherein component b) is present within a weight percent range between 15 and 50.

57. The method of claim 41, wherein component b) is present within a weight percent range between 15 and 50.

58. The composite material of claim 1, wherein component b) is present within a weight percent range between 20 and 50.

59. The method of claim 41, wherein component b) is present within a weight percent range between 20 and 50.

60. The composite material of claim 1, wherein component b) is present within a weight percent range between 30 and 50.

61. The method of claim 41, wherein component b) is present within a weight percent range between 30 and 50.

62. The composite material of claim 1, wherein water has not been removed from component b) prior to use.

63. The method of claim 41, wherein water has not been removed from component b) prior to use.

* * * * *